Patented Feb. 11, 1930

1,746,657

UNITED STATES PATENT OFFICE

WALTER J. KEMP, OF KOKOMO, INDIANA

PROCESS OF PRODUCING PURE TOMATO JUICE

No Drawing.    Application filed March 23, 1928. Serial No. 264,278.

This invention relates to the process of producing pure tomato juice for beverage or health purposes, wherein it may or may not be bottled or canned with suitable flavoring such as salt or the like.

The object of the invention resides in the processing of tomatoes to obtain a pure and clear product in the form of juice having the tomato pulp and fibers incorporated therein in the form of small particles held in permanent suspension.

A further object of the invention resides in the processing thereof so as to maintain the juice in a homogeneous condition and prevent separation and precipitation of the solids from the liquid.

By means of this process, the minute particles of solids remain in substantially permanent suspension, giving the product a clear and uniform appearance and smooth taste. Furthermore, in bottling or canning the juice, there will be no separation or settling which is of material importance in the commercial product.

The process consists in extracting the juice of the tomato by compressing the whole tomato under constant pressure, and forcing the juice through a straining screen. By constant pressure is meant a pressure or force which is regular and which is exerted upon the material without any beating, stirring or agitation thereof. This step in the process distinguishes from the usual practice of beating or whipping the tomato in a beater, by means of paddles or the like, and expelling the juice through a straining screen by centrifugal action and the impact of the whipping blades.

After the juice has been extracted and strained it is viscolized or homogenized by passing it through a homogenizing machine of the character commonly employed in creameries for breaking up fattish globules. The homogenizing process with respect to the tomato juice acts to break up and disintegrate any particles of pulp or fiber carried through the straining screen, and thoroughly incorporate such minute solids with the fluid, giving it a rich food-like character of high nutritious value and with a maximum of vitamines. Thus, a thicker and richer product is obtained over the thinner fluid while having all the characteristics of a fluid by reason of the finely divided particles of solids which are caused to remain in suspension in the fluid by the homogenizing process.

The next step resides in pasteurizing the homogenized product by passing it through a flash pasteurizer of the character employed in creameries, which destroys and eliminates bacteria in the usual manner, and thereby permitting the product to be prepared for bottling or canning.

The resultant product as above stated, when bottled or canned is such that the minute solids consisting of the broken up particles of pulp and fiber will remain in suspension in the fluid over a long period of time, and are thoroughly incorporated therein so as to be rich in vitamines and food properties while having a smooth liquefied appearance and taste.

The invention claimed is:

1. The process of producing tomato juice consisting in extracting the juice from the tomato by constant pressure and without agitation with strained particles of fiber and pulp included therewith, and homogenizing the juice with the particles of pulp and fiber incorporated therewith whereby said particles will be broken up and incorporated with the juice in substantially permanent suspension.

2. The process of producing tomato juice consisting in extracting the juice from the tomato by constant pressure and without agitation with strained particles of fiber and pulp included therewith, homogenezing the juice with the particles of pulp and fiber incorporated therewith whereby said particles will be broken up and incorporated with the juice in substantially permanent suspension, and thereafter pasteurizing the homogenized product for bottling and canning purposes.

In witness whereof, I have hereunto affixed my signature.

WALTER J. KEMP.